US012049056B2

(12) United States Patent
Miyamoto

(10) Patent No.: US 12,049,056 B2
(45) Date of Patent: Jul. 30, 2024

(54) PAPER FOLDING DEVICE

(71) Applicant: DUPLO SEIKO CORPORATION, Kinokawa (JP)

(72) Inventor: Chikara Miyamoto, Kinokawa (JP)

(73) Assignee: DUPLO SEIKO CORPORATION, Kinokawa (JP)

( * ) Notice: Subject to any disclaimer, the term of this patent is extended or adjusted under 35 U.S.C. 154(b) by 8 days.

(21) Appl. No.: 17/999,724

(22) PCT Filed: Dec. 8, 2021

(86) PCT No.: PCT/JP2021/045103
§ 371 (c)(1),
(2) Date: Nov. 23, 2022

(87) PCT Pub. No.: WO2022/145184
PCT Pub. Date: Jul. 7, 2022

(65) Prior Publication Data
US 2023/0278306 A1 Sep. 7, 2023

(30) Foreign Application Priority Data
Dec. 28, 2020 (JP) ................................ 2020-218980

(51) Int. Cl.

| | |
|---|---|
| ***B31B 70/52*** | (2017.01) |
| ***B31B 70/26*** | (2017.01) |
| ***B65H 45/30*** | (2006.01) |
| *B31B 160/10* | (2017.01) |
| *B43M 5/04* | (2006.01) |

(52) U.S. Cl.
CPC ............ *B31B 70/52* (2017.08); *B31B 70/261* (2017.08); *B65H 45/30* (2013.01); *B31B 2160/102* (2017.08); *B43M 5/042* (2013.01); *B65H 2601/10* (2013.01)

(58) Field of Classification Search
CPC ........ B43M 5/042; B31B 49/04; B31B 70/26; B31B 50/26; B65B 63/04
USPC .......................................................... 493/416
See application file for complete search history.

(56) References Cited

FOREIGN PATENT DOCUMENTS

| | | | |
|---|---|---|---|
| JP | H07285733 * | 10/1995 | ............ B65H 45/14 |
| JP | H07285733 A | 10/1995 | |
| JP | H09240628 A | 9/1997 | |
| WO | 2019043760 A1 | 3/2019 | |

(Continued)

OTHER PUBLICATIONS

International Search Report (PCT/ISA/210) with translation and Written Opinion (PCT/ISA/237) mailed on Mar. 1, 2022, by the Japan Patent Office as the International Searching Authority for International Application No. PCT/JP2021/045103. (9 pages).

*Primary Examiner* — Jacob A Smith
(74) *Attorney, Agent, or Firm* — BUCHANAN INGERSOLL & ROONEY PC

(57) ABSTRACT

An object of the present invention is to ensure rigid formation of the folds of the protrusions of the paper sheet and smooth conveyance of the folding-processed paper sheet to the downstream side of the folding position in the paper conveyance direction without causing the problems such as jamming. A folding unit includes a lower guide plate arranged at a position facing a folding plate at the folding position, and an arrangement position of a turning shaft of the folding plate is vertically movable with respect to the lower guide plate.

7 Claims, 13 Drawing Sheets

(56) References Cited

FOREIGN PATENT DOCUMENTS

| | | | | | |
|---|---|---|---|---|---|
| WO | WO2019043760 | * | 3/2019 | ............. | B31B 70/26 |
| WO | WO-2019043760 A1 | * | 3/2019 | ............. | B31B 50/26 |

* cited by examiner

PAPER FOLDING DEVICE

TECHNICAL FIELD

The present invention relates to a paper folding device. Particularly, the present invention relates to a paper folding device disposed in a paper bag making machine making envelopes, a sealing device, etc.

BACKGROUND ART

In a conventional sealing device (e.g., Patent Document 1) including a paper folding device that folds back a flap while moving an envelope along a predetermined conveyance path, the configuration is such that an envelope with adhesive film attached is conveyed to a flap pressing mechanism (paper folding device), where a folding plate turns to fold the flap and press the flap against an envelope body to thereby allow the flap to adhere to the envelope body.

Patent Document 1: JP9-240628A

SUMMARY OF THE INVENTION

In the paper folding device of the sealing device described in Patent Document 1 above, however, during the paper folding processing, depending on conditions such as the type or size of paper to be folding-processed, the paper conveyance after the folding processing is unstable from the folding position to the next pressing position where the fold is pressed by pressing rollers. As a result, a problem may occur e.g., that the accuracy of the fold position is not ensured due to misalignment of the folding position at the pressing position.

Thus, in Japan Patent Application No. 2020-72047, the applicant of the present application has proposed, as the invention to solve the above various problems of the existing technology, a paper bag making machine including a paper folding device with a novel configuration as shown in FIG. 5A to FIG. 5D of the present application.

This paper bag making machine includes a first folding device 3*a* as a paper folding device that includes as shown in FIG. 5A: a folding plate 32 turning on a rotating shaft 31 extending along a conveyance direction; an upper guide plate 36 spaced a predetermined gap (approx. 0.5 mm) above a lower guide plate 33; and a conveyance roller pair (a driving roller 38 and a driven roller 35) conveying downstream a paper sheet 100 conveyed on the lower guide plate 33. The upper guide plate 36 and the lower guide plate 33 are notched at a nip portion of the conveyance roller pair.

In the paper folding device, when performing folding processing of a protrusion 103 (corresponding to the flap) as a folded part of the paper sheet 100, the protrusion 103 of the paper sheet 100 placed on the folding plate 32 positioned outside in the width direction as in FIG. 5A is turned in direction R5 as in FIG. 5B. Thus the protrusion 103 can be folded back inside in such a manner that it is superimposed via the upper guide plate 36 on the surface of a back surface part 102 as the body of the paper sheet 100 as in FIG. 5C.

Afterward, in FIG. 5D, the folding plate 32 turns in direction R4 away from the outside lower guide plate 33. The paper sheet 100 with the protrusion 103 folded back is then conveyed downstream in the conveyance direction by the conveyance roller pair (the driving roller 38 and the driven roller 35). By allowing the folding plate 32 to turn in direction R6 away from the lower guide plate 33 by at least a predetermined angle before starting conveyance of the paper sheet 100, the folding-processed paper sheet 100 can be smoothly conveyed downstream of the folding position in the paper conveyance direction without being interfered with by the folding plate 32 and the pair of upper and lower guide plates 36 and 33.

Since, according to the above, the protrusion 103 of the paper sheet 100 is folded back on the top surface of the upper guide plate 36 with the back surface part 102 of the paper sheet 100 retained between the pair of upper and lower guide plates (36 and 33), wrinkles are prevented from occurring at the crease portion of the paper sheet 100 at the time of folding processing, and the accuracy of the fold position can be ensured when folding the folded part 103.

With further advancement in research and development of the paper folding device, however, the inventor of the present application discovered a new problem about the paper folding device having the novel configuration proposed by the applicant of this application, and reached findings that there is room for further improvement in performance of the paper folding device through solution of this problem.

(A) That is, in FIG. 5C, it is necessary for rigid formation of a fold 111 of the paper sheet 100 to arrange the rotating shaft 31 of the folding plate 32 at a position (as low as possible) allowing the undersurface of the folding plate 32 to be fully superimposed on the top surface of the upper guide plate 36.

(B) On the other hand, in FIG. 5D, for smooth conveyance of the folding-processed paper sheet 100 toward downstream side of the folding position in the paper conveyance direction, the folding plate 32 needs to retract a predetermined angle or more in direction R6, otherwise the folding plate becomes a load for conveyance, bringing about problems such as jamming, etc. It is especially necessary to sufficiently open the area around the fold 111. For example, the opening degree of the folding plate 32 from the upper guide plate 36 is preferably 30 degrees or more.

(C) Instead of (B) described above, it is more preferable for stable conveyance in FIG. 5D to secure a proper gap for the paper sheet on the upper guide plate 36 and to keep the folding plate 32 as horizontal as possible so that the folding plate 32 cooperates with the lower guide plate 33 to function also as a paper conveyance guide. For example, it is preferred that the folding plate 32 be horizontal and that the gap between the folding plate 32 and the lower guide plate 33 be of the order of 1.5 mm to 2 mm.

According to the above, focusing on the position of the rotating shaft 31 of the folding plate 32, in order to meet all the conditions (A), (B), and (C), it is preferred to position the rotating shaft 31 of the folding plate 32 as "below" as possible when the paper sheet is folding-processed, and to retract the folding plate 32 "above" with a proper gap while keeping it horizontal when the paper sheet 100 after folding processing is conveyed downstream of the folding position in the paper conveyance direction. It is therefore preferable that the rotating shaft 31 of the folding plate 32 be vertically movable depending on the situation. The problem of (B) described above is solved by satisfying (C) described above.

The present invention was conceived in view of the novel technical problems newly discovered in this manner, and an object thereof is to ensure rigid formation of the folds 111 of the protrusions 103 of the paper sheet 100 and smooth conveyance of the folding-processed paper sheet to the downstream side of the folding position in the paper conveyance direction without causing the problems such as jamming.

In order to achieve the object, a paper folding device according to claim 1 of the present invention that is a device for folding a planar paper sheet having a body part and a folded part projecting from the body part while conveying the paper sheet along a paper conveyance path. The paper folding device includes: a folding unit disposed at a folding position where the paper sheet is folded on the paper conveyance path, the folding unit including a folding plate reciprocatively turning on a turning shaft substantially parallel to the paper conveyance path, to thereby fold the folded part toward the body part, and a lower guide plate arranged at a position facing the folding plate at the folding position, wherein the turning shaft is vertically movable with respect to the lower guide plate.

The paper folding device according to claim 2 of the present invention, in the paper folding device of claim 2, wherein the folding plate is configured to reciprocatively turn on the turning shaft substantially parallel to the paper conveyance path, through the folding position where the folded part of the paper sheet is folded, between a placement position where the folded part of the paper sheet is placed and a pressing position where the folded part of the paper sheet is pressed toward the body part.

The paper folding device according to claim 3 of the present invention, in the paper folding device of claim 1 or 2, wherein the arrangement position of the turning shaft of the folding plate includes at least a first position where the folded part of the paper sheet is folded by turn of the folding plate and then pressed, and a second position where the pressing is released during paper conveyance after the pressing to form a predetermined gap between the paper sheet and the folding plate.

The paper folding device according to claim 4 of the present invention, in the paper folding device of anyone of claims 1 to 3, includes: a paper folding-back mechanism that reciprocatively turns the folding plate on the turning shaft of the folding plate, the paper folding-back mechanism being configured to move the arrangement position of the turning shaft of the folding plate in liaison with an angle through which the folding plate is turned.

The paper folding device according to claim 5 of the present invention, in the paper folding device of anyone of claims 1 to 4, wherein the folding unit includes an upper guide plate arranged spaced a predetermined gap above the lower guide plate at the folding position, the upper guide plate together with the lower guide plate making up a part of the paper conveyance path, and the folding plate is configured such that, when performing folding processing of the folded part of the paper sheet, an undersurface of the folding plate is superimposed on a top surface of the upper guide plate with the folded part of the paper sheet clamped therebetween.

The paper folding device according to claim 6 of the present invention, in the paper folding device of anyone of claims 1 to 5, wherein the folding unit includes a pair of conveyance rollers for guiding the body part of the paper sheet so as to pass through between the upper guide plate and the lower guide plate at the folding position on the paper conveyance path, and control unit that controls drive of the pair of conveyance rollers, and when the folding unit performs folding processing of the folded part of the paper sheet, the control unit provides control to bring drive of the pair of conveyance rollers to a halt to stop conveyance of the paper sheet at the folding position so that the folded part of the paper sheet is folding-processed with the body part of the paper sheet retained between the pair of conveyance rollers.

The paper folding device according to claim 7 of the present invention, in the paper folding device of anyone of claims 1 to 6, includes: a crease processing unit disposed upstream of the folding position in a paper conveyance direction, the crease processing unit being configured to form a crease in advance at a fold when performing folding processing of the folded part of the paper sheet.

According to the invention of claim 1, the folding unit includes the lower guide plate arranged at the position facing the folding plate at the folding position, and the turning shaft is vertically movable with respect to the lower guide plate. It is possible by moving the arrangement position of the turning shaft of the folding plate to the optimum position, to rigidly form the folds of the paper folded parts upon the folding processing and to smoothly convey the folding-processed paper sheet toward the downstream side of the folding position in the paper conveyance direction.

According to the invention of claim 2, the folding plate is configured to reciprocatively turn on the turning shaft substantially parallel to the paper conveyance path, through the folding position where the folded part of the paper sheet is folded, between a placement position where the folded part of the paper sheet is placed and a pressing position where the folded part of the paper sheet is pressed toward the body part. The folds of the paper folded parts are formed rigidly and with high accuracy upon the folding processing.

According to the invention of claim 3, the arrangement position of the turning shaft of the folding plate includes at least the first position where the folded part of the paper sheet is folded by turn of the folding plate and then pressed, and the second position where the pressing is released during paper conveyance after the pressing to form a predetermined gap between the paper sheet and the folding plate. It is possible to rigidly form the folds of the paper folded parts upon the folding processing and to smoothly convey the folding-processed paper sheet toward the downstream side of the folding position in the paper conveyance direction.

According to the invention of claim 4, the paper folding device includes a paper folding-back mechanism that reciprocatively turns the folding plate on the turning shaft of the folding plate, the paper folding-back mechanism being configured to move the arrangement position of the turning shaft of the folding plate in liaison with an angle through which the folding plate is turned. It is possible to rigidly form the fold of the paper folded part upon the folding processing and to smoothly convey the folding-processed paper sheet toward the downstream side of the folding position in the paper conveyance direction.

According to the invention of claim 5, the folding unit includes an upper guide plate arranged spaced a predetermined gap above the lower guide plate at the folding position, the upper guide plate together with the lower guide plate making up a part of the paper conveyance path, and the folding plate is configured such that, when performing folding processing of the folded part of the paper sheet, an undersurface of the folding plate is superimposed on a top surface of the upper guide plate with the folded part of the paper sheet clamped therebetween. It is possible to prevent wrinkles from occurring at the paper fold portion upon processing and further to secure the accuracy of the fold position when folding the folded part.

According to the invention of claim 6, when the folding unit performs folding processing of the folded part of the paper sheet, the control unit provides control to bring drive of the pair of conveyance rollers to a halt to stop conveyance of the paper sheet at the folding position so that the folded part of the paper sheet is folding-processed with the body part of the paper sheet retained between the pair of conveyance rollers. The paper folded part is folded back on the top surface of the upper guide plate with the paper body retained between the pair of upper and lower guide plates, so that it is possible to prevent wrinkles from occurring at the paper fold portion upon processing and to further secure the accuracy of the fold position when folding the folded part.

According to the invention of claim 7, the paper folding device includes the crease processing unit disposed upstream of the folding position in a paper conveyance direction, the crease processing unit being configured to form a crease in advance at a fold when performing folding processing of the folded part of the paper sheet. It is possible, by previously forming a crease at the fold used when the paper folded part is folding-processed, to further secure the accuracy of the fold position when the folded part is folded.

EMBODIMENT(S) FOR CARRYING OUT THE INVENTION

Figure 1:
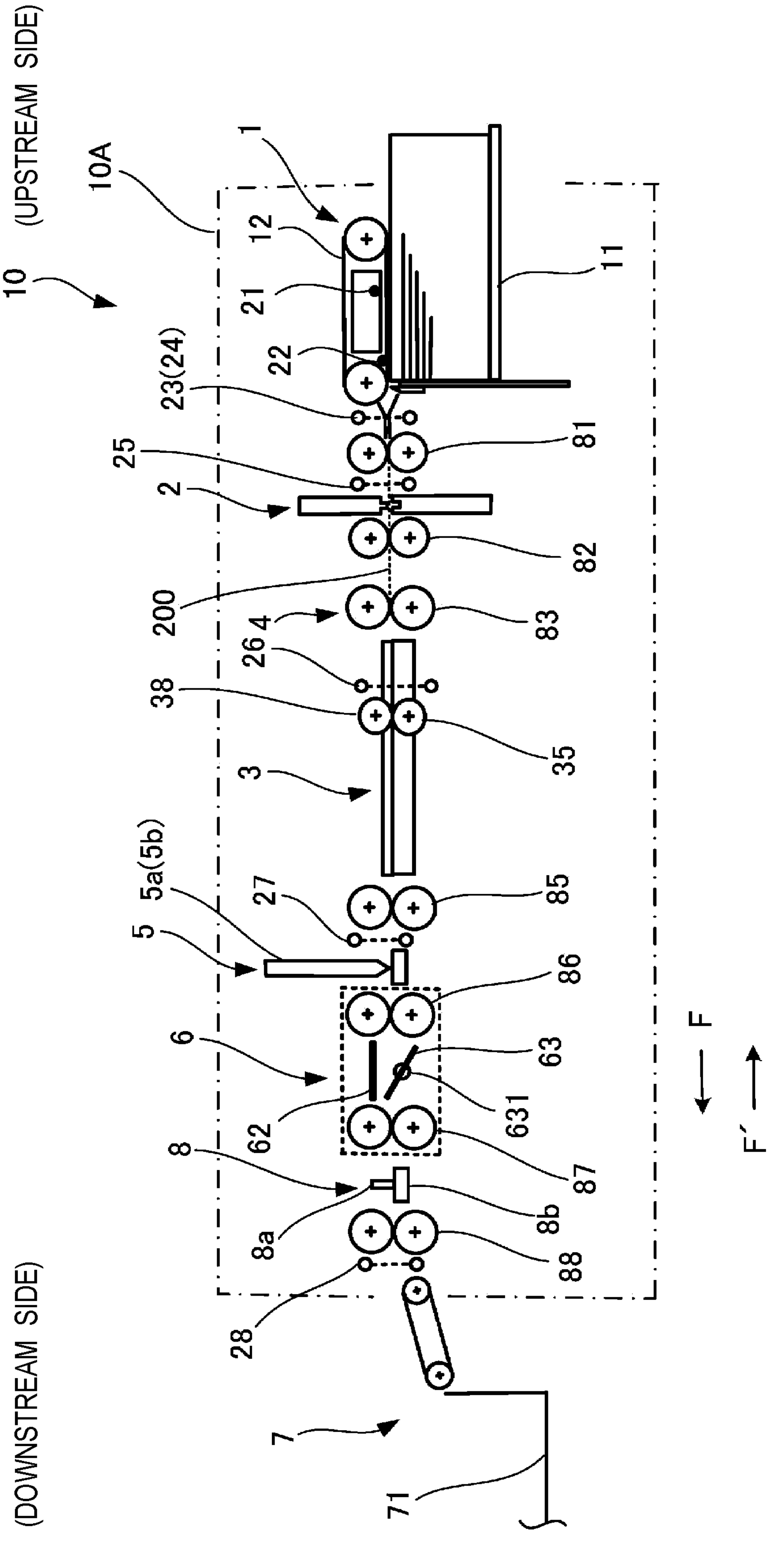
FIG. 1 is a schematic overall configuration diagram of a paper bag making machine of a first embodiment of the present invention.

FIG. 1 shows a paper bag making machine 10 of an embodiment that employs a paper folding device (first folding section 3) of the present invention. FIG. 1 is an overall configuration diagram of the paper bag making machine 10. The paper bag making machine 10 includes a device body 10A that includes, in order from the upstream side in the conveyance direction, a paper feed section 1, a first crease processing section 2, a second crease processing section 4, the first folding section 3, a glue application section 5, a second folding section 6, and a paper discharge section 7.

Figure 4:
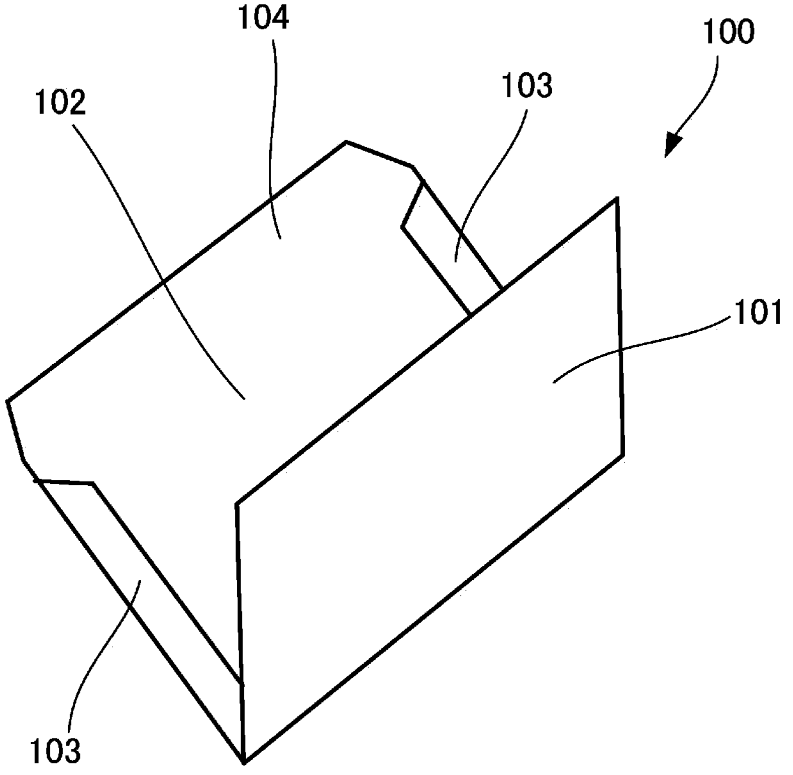
FIG. 4 is a perspective view showing the state in the middle of making of a Western-style envelope.
Figure 5A:
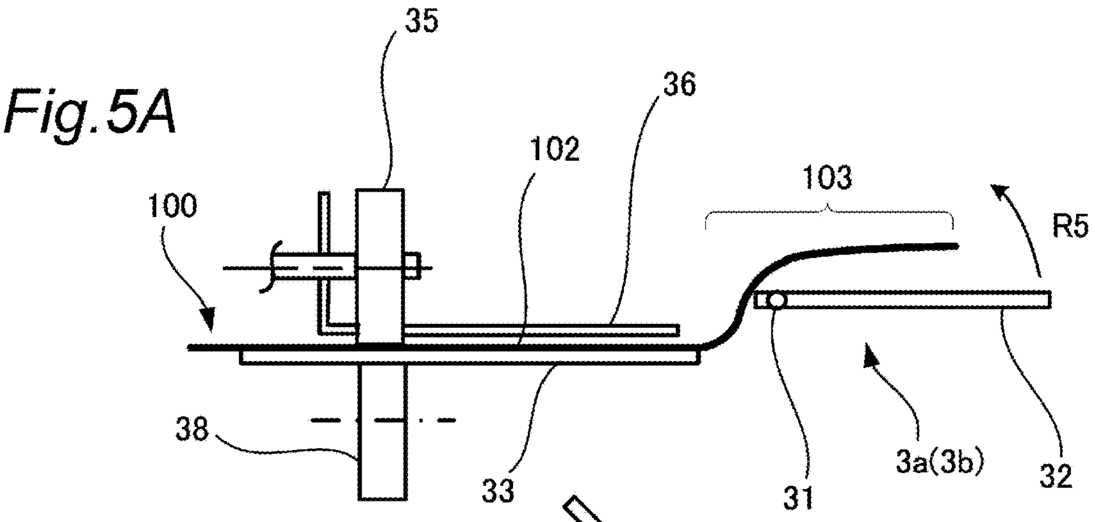
FIGS. 5A, 5B, 5C and 5D are views showing the states before and after folding back a folding plate of a first folding section in the prior application of the applicant of the present application.
Figure 5B:
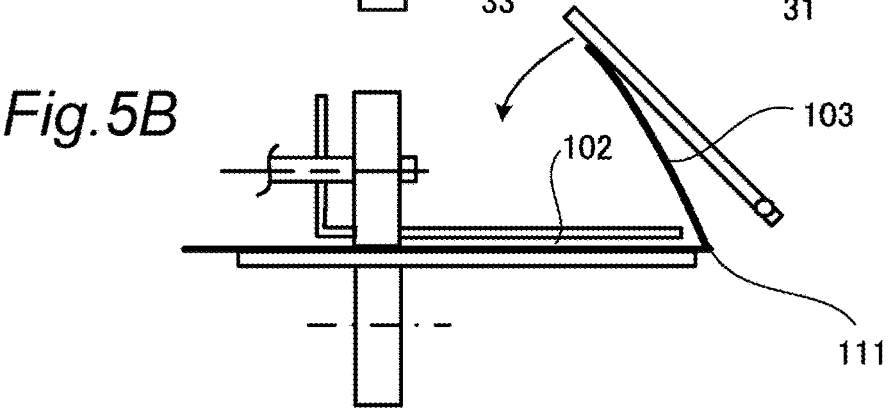
Figure 5C:
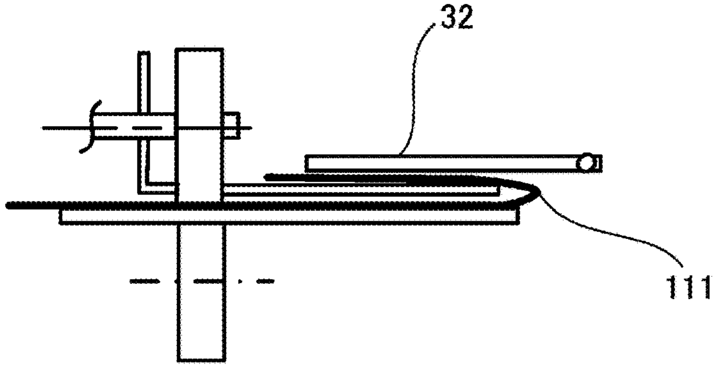
Figure 5D:
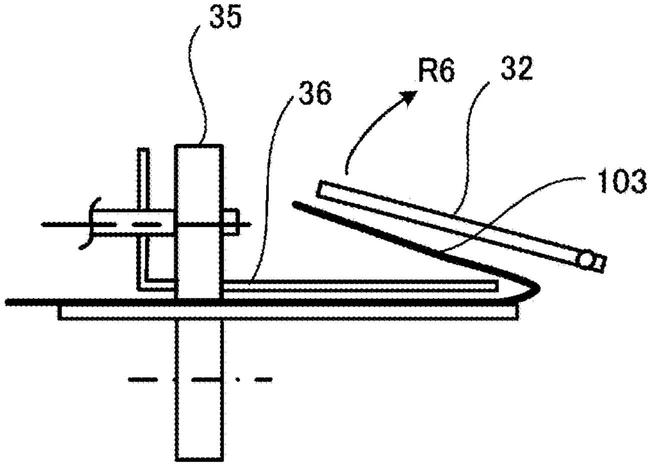

A "Western-style envelope" of a general form is of a transversely elongated rectangular shape and has a sealing opening formed on the long side. When making the Western-style envelope by use of the paper bag making machine 10, for example, as shown in FIG. 4, glue is applied to protrusions 103 folded back on both sides of a back surface part 102 of a paper sheet 100, and a front surface part 101 is folded back to be crimped to the protrusions 103.

Figure 2A:
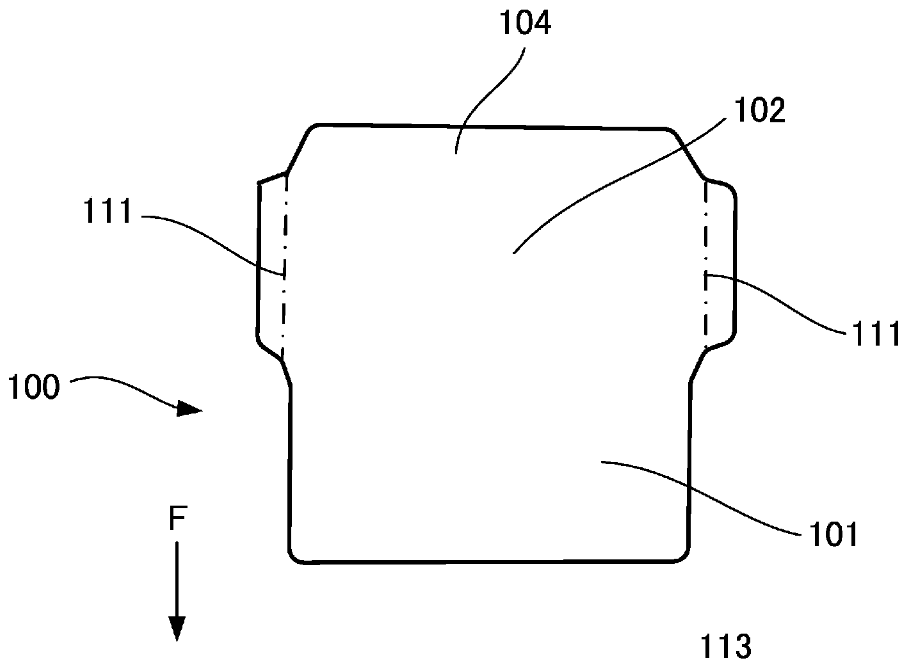
FIGS. 2A, 2B, and 2C are plan views showing the states of a paper sheet processed by the paper bag making machine of FIG. 1.
Figure 2B:
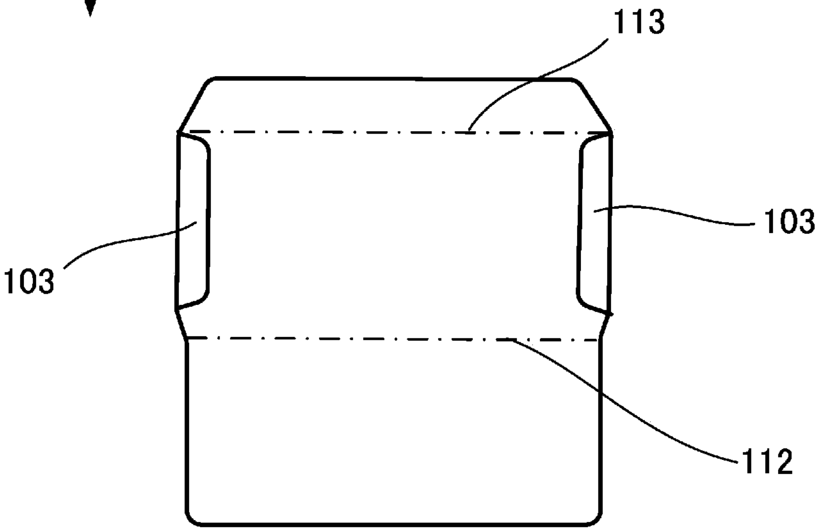
Figure 2C:
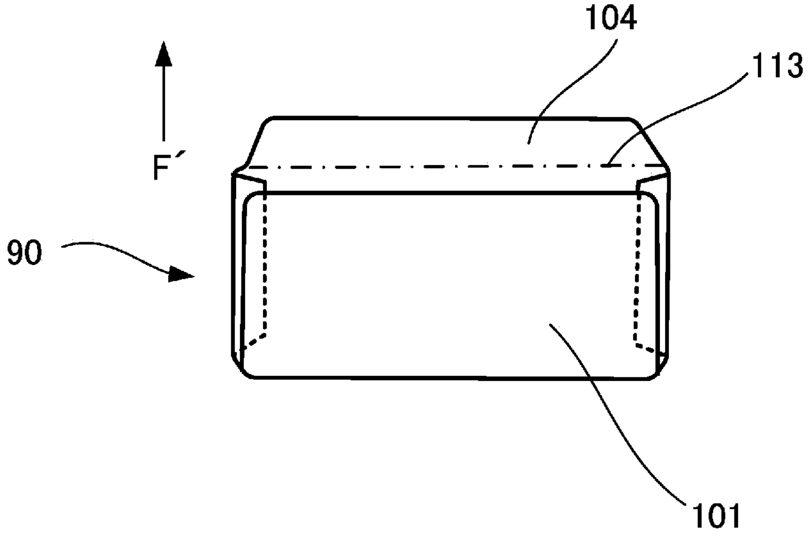

Specifically, the paper bag making machine 10 makes a Western-style envelope 90 by processing the planar paper sheet 100 shown in FIG. 2A in such a manner as shown in FIGS. 2B and 2C while conveying the paper sheet 100 in direction F.

The paper sheet 100 includes the front surface part 101, the back surface part 102 as a "main part" of the paper sheet 100, the protrusions 103 for glue margins as "folded parts" of the paper sheet 100 that protrude on both sides of the back surface part 102, and a backmost surface part 104. As shown in FIG. 2B, the paper sheet 100 is folded at first folds 111 that are boundaries between the back surface part 102 and the protrusions 103, and then, as shown in FIG. 2C, folded at a second fold 112 that is a boundary between the front surface part 101 and the back surface part 102. Glue is applied to surfaces of the protrusions 103 folded back at the first folds 111. The front surface part 101 folded back at the second fold 112 is joined at its both edges to the protrusions 103. The first folds 111 are along the conveyance direction. The second fold 112 is along a direction (i.e., width direction) orthogonal to the conveyance direction.

Figure 3A:
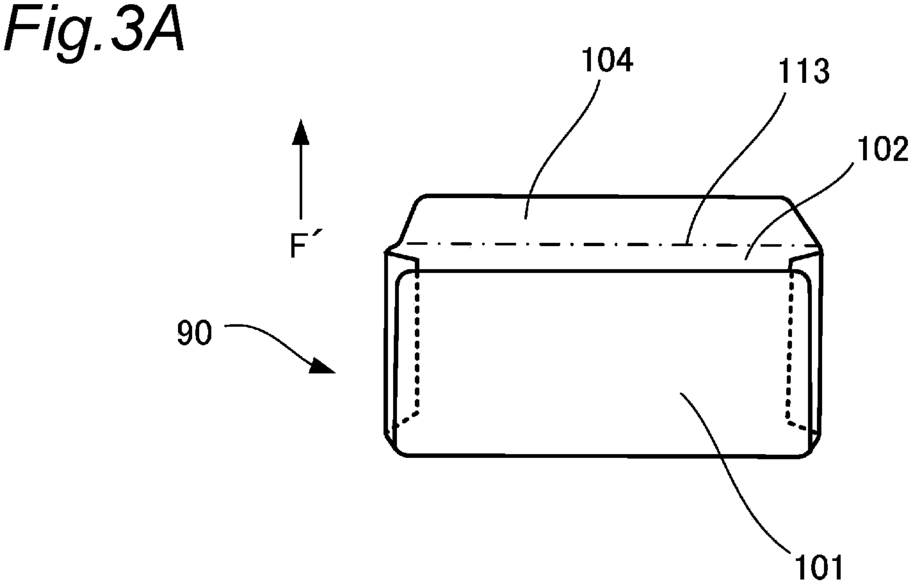
FIGS. 3A and 3B are plan views showing the folding-processed state of the paper sheet of FIG. 2.
Figure 3B:
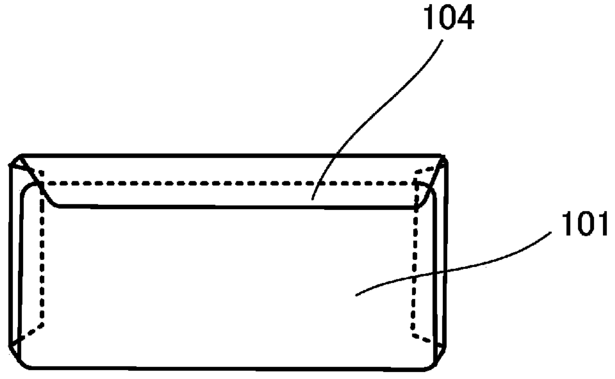

Although the deliverable can be the Western-style envelope 90 of FIG. 2C, it may be configured such that the backmost surface part 104 is further folded at a third fold 113 that is a boundary between the back surface part 102 and the backmost surface part 104, by processing the Western-style envelope 90 of FIG. 2C in such a manner as shown in FIGS. 3A and 3B while conveying it in direction F'. According to the above configuration, when sealing the envelope with tape or glue after insertion of contents, the backmost surface part 104 can be neatly sealed on the folded-back front surface part 101 due to the presence of the crease.

[Paper Feed Section 1]

The paper feed section 1 includes an air paper feed unit 12 of an air suction belt type, a paper feed tray 11 of an elevator type that ascends or descends depending on the amount of paper loaded, and a conveyance roller 81 that further conveys paper sent out by the air paper feed unit 12 to the downstream side in the conveyance direction. The air paper feed unit 12 has sensors 21 and 22 arranged thereon, the sensor 21 detecting the upper limit position of a topmost surface of paper sheets loaded on the paper feed tray 11, the sensor 22 detecting the suction of a topmost one of paper sheets loaded on the paper feed tray 11 onto a bottom surface of the air paper feed unit 12.

The paper bag making machine 10 further includes, in addition to the conveyance roller 81, five conveyance roller pairs 82, 85, 86, 87, and 88. The five conveyance roller pairs make up a conveyance plane 200 on which the paper sheet 100 is conveyed. The conveyance plane 200 is coplanar from the air paper feed unit 12 up to the conveyance roller pair 88. Sensors 23, 24, 25, 26, 27, and 28 detecting the passage of paper (detecting double feeding of paper sheets) at their respective positions are arranged on the conveyance plane 200 on which the paper sheet 100 is conveyed. The sensors may be, for example, optical transmission sensors.

[First Crease Processing Section 2]

As shown in FIG. 1, the first crease processing section 2 includes an upper die with a convex upper portion and a lower die with a concave lower portion to form transverse creases perpendicular to the paper conveyance direction as the second and third folds 112 and 113 of the paper sheet 100. The crease processing section 2 can employ any known mechanism.

[Second Crease Processing Section 4]

As shown in FIG. 1, the second crease processing section 4 includes a crease blade 83 that has a circular upper blade with a convex portion on its periphery, and a circular lower blade with a concave portion on its periphery. The second crease processing section 4 is disposed at two places in the width direction perpendicular to the conveyance direction to form vertical creases along the paper conveyance direction at the first folds 111 (two places) of the paper sheet 100. The second crease processing section 4 can employ any known mechanism. The crease blade 83 may be composed of a circular upper blade whose periphery has a concave portion formed thereon and a circular lower blade whose periphery has a convex portion formed thereon.

[First Folding Section 3]

Figure 6:
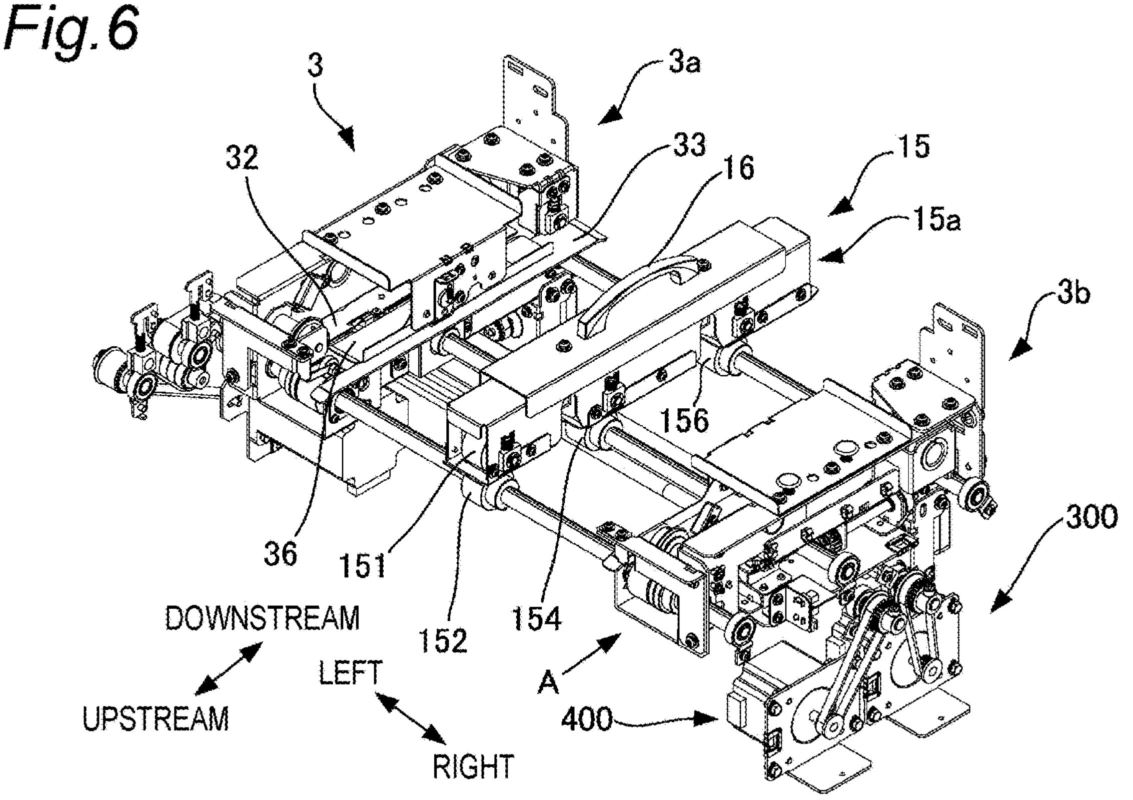
FIG. 6 is a perspective view showing an overall configuration of a first folding section.
Figure 7:
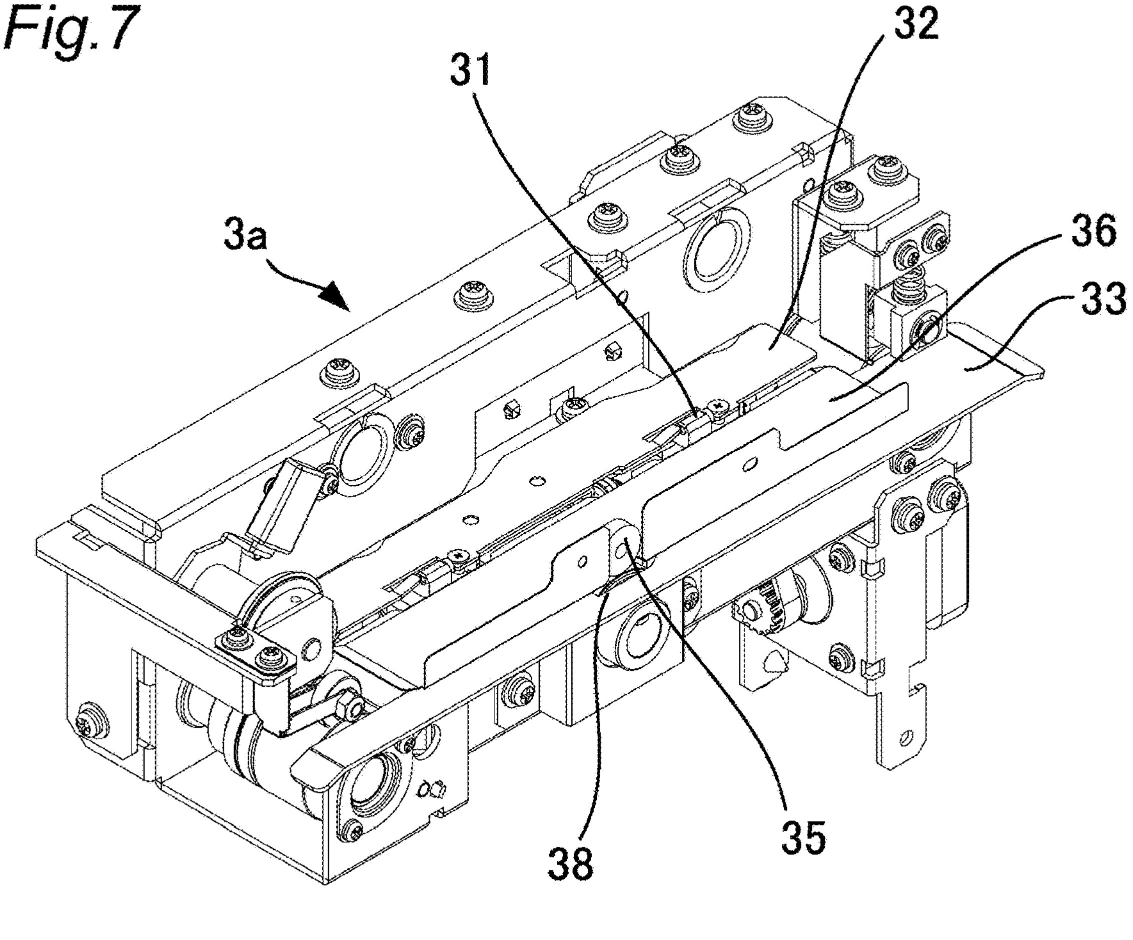
FIG. 7 is a perspective view showing a configuration of a first folding device.

FIG. 6 is a perspective view showing an overall configuration of the first folding section 3. As shown in FIG. 6, the first folding section 3 includes, as a unit to fold back the left and right protrusions 103 of the paper sheet 100, a pair of folding devices (a first folding device 3*a* and a second folding device 3*b*) arranged facing each other on both sides in the width direction perpendicular to the paper conveyance direction. The pair of folding devices 3*a* and 3*b* have a transversely symmetric configuration. FIG. 7 shows the first folding device 3*a* arranged on the left side of FIG. 6, the first folding device 3*a* having a folding plate 32 that turns on a rotating shaft 31 extending along the conveyance direction. The first folding device 3*a* includes an upper guide plate 36 spaced a predetermined gap above a lower guide plate 33, and a pair of conveyance rollers (a driving roller 38 and a driven roller 35) that convey downstream the paper sheet 100 conveyed on the lower guide plate 33. In FIG. 7, a rotating shaft of the driven roller 35 and other driving mechanisms are not shown.

Due to the disposition of the folding unit in the form of the pair of folding devices, i.e., the first folding device 3*a* and the second folding device 3*b* arranged facing each other on both sides in the width direction perpendicular to the paper conveyance direction, in the case that the paper sheet has the protrusions 103 at two places on both sides in the width direction perpendicular to the paper conveyance direction, the protrusions 103 at two places can be folded back at the same time through a single paper conveyance, which results in a good workability.

In FIG. 6, between the first folding device 3*a* and the second folding device 3*b*, conveyance unit 15 is further arranged that conveys the paper sheet on a conveyance path while holding a central portion of the paper sheet. The conveyance unit 15 includes upper and lower conveyance rollers 151 and 152, 153 and 154, and 155 and 156 in pairs. The upper conveyance rollers 151, 153 (not shown), and 155 (not shown) of the upper and lower conveyance roller pairs are unitized so that at the time of paper jams and maintenance, a unit 15*a* can be easily detached from and attached to the paper folding device body 10 by the operator holding a handle 16 of the unit 15*a*.

Since the conveyance unit 15 conveying the paper sheet on the conveyance path while holding the central portion of the paper sheet is further arranged between the first folding device 3*a* and the second folding device 3*b*, especially in the case of folding back the folded parts at two places at the same time through a single paper conveyance, the paper conveyance is stabilized, ensuring a stable processing accuracy.

Figure 10A:
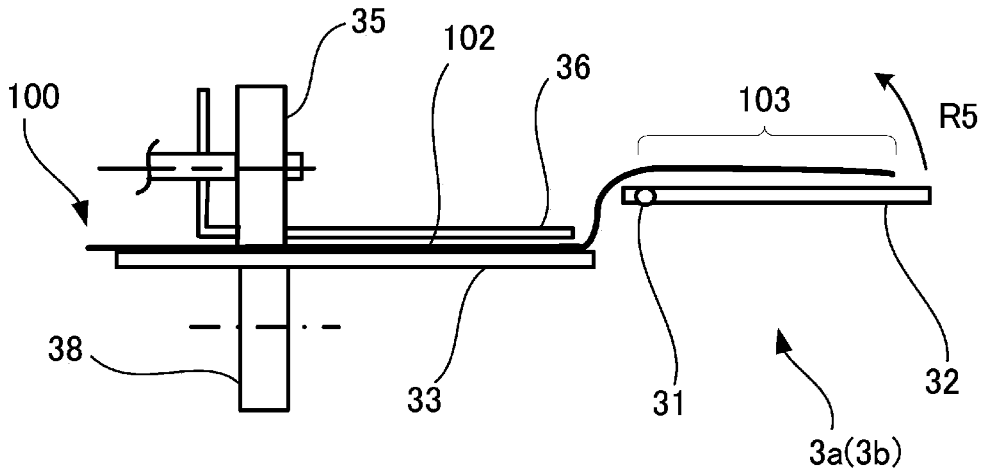
FIGS. 10A, 10B and 10C are views showing the states before and after folding back the folding plate in the first folding section.

The first folding device 3*a*, as shown in FIG. 10A, has the folding plate 32 that turns on the rotating shaft 31 extending along the conveyance direction. The first folding device 3*a* further includes the upper guide plate 36 spaced a predetermined gap above the lower guide plate 33, and the pair of conveyance rollers (the driving roller 38 and the driven roller 35) that convey downstream the paper sheet 100 conveyed on the lower guide plate 33. In FIG. 7, a rotating shaft of the driven roller 35 and other driving mechanisms are not shown. The upper and lower guide plates 36 and 33 are notched at a nip portion of the roller pair.

Figure 10B:
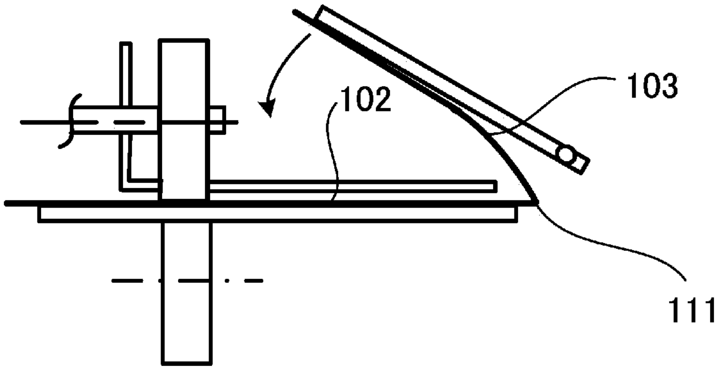
Figure 10C:
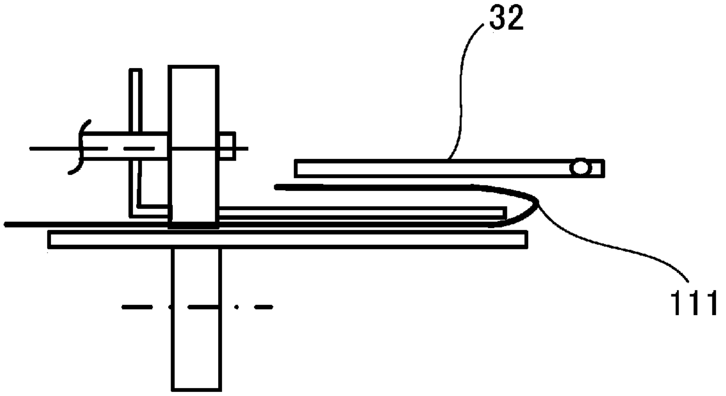

At a folding position where the protrusion 103 of the paper sheet is folding-processed, the protrusion 103 of the paper sheet 100 placed on the folding plate 32 positioned outside in the width direction as in FIG. 10A can be folded back inside such that the protrusion 103 is overlaid via the upper guide plate 36 on the surface of the back surface part 102 as in FIG. 10C, by turning the folding plate 32 in direction R5 as in FIG. 10B. Since the second folding device 3*b* also has the same configuration, description thereof will be omitted herein. In FIGS. 10A to 10C, the same constituent elements as those in FIGS. 5A to 5D will be designated by the same reference numerals.

Since, according to the above, the folded part of the paper sheet is folded back on the top surface of the upper guide plate with the paper body part retained between the pair of upper and lower guide plates (36 and 33), it is possible during the processing to prevent wrinkles from forming at the folds of the paper sheet and further to ensure the accuracy of the fold positions when folding the protrusions 103 (folded parts).

The unit to fold back the protrusion 103 of the paper sheet 100 by turning the folding plate 32 is configured, as a paper fold-back mechanism, from a turning mechanism 300 and a rotating shaft moving mechanism 50. The turning mechanism 300 is a mechanism that turns the folding plate 32 on the rotating shaft 31, while the rotating shaft moving mechanism 50 is a mechanism that moves the rotating shaft 31 of the folding plate 32 vertically. The both mechanisms are coupled together by sharing the rotating shaft 31 of the folding plate 32.

Figure 8:
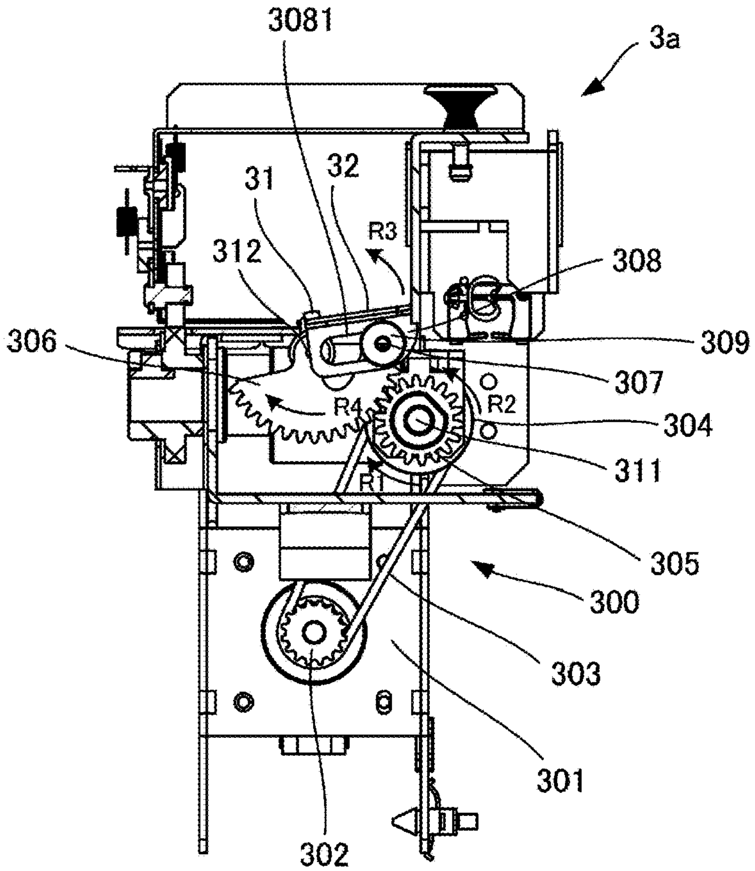
FIG. 8 is a view showing a folding plate rotation mechanism of the first folding device.
Figure 9:
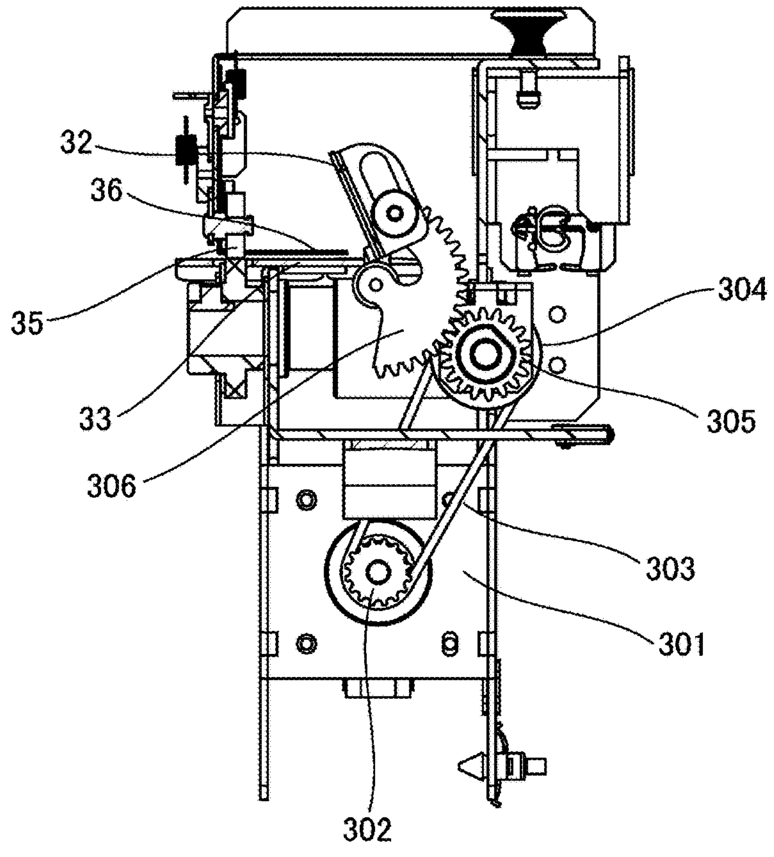
FIG. 9 is a view showing the folding plate rotation mechanism of the first folding device.

The turning mechanism 300 for the folding plate 32 will first be described with reference to FIGS. 8 and 9. In FIGS. 8 and 9, the rotating shaft moving mechanism 50 described later are not shown.

FIG. 8 shows the state where the folding plate 32 is arranged at a placement position to place the protrusion 103 of the paper sheet 100, and FIG. 9 shows the state where the folding plate 32 is on the way to an overlaid position at which the protrusion 103 of the paper sheet is overlaid toward the paper body part. FIGS. 8 and 9 are each a front view of the first folding device 3*b* of FIG. 6, seen from direction A. Since the second folding device 3*a* also has the same configuration as that of the first folding device 3*b*, description thereof will be omitted.

The first folding device 3*a* includes, as shown in FIG. 8, the folding unit having the folding plate 32 that reciprocatively turns on the rotating shaft 31 extending along the conveyance direction. The folding plate 32 is disposed so as to turn 180 degrees on a horizontal plane. The turning mechanism 300 for the folding plate 32 has a motor 301, a first pulley 302, a transmission belt 303, a second pulley 304, a rotary gear 305, a swing gear 306, a slide shaft 307, and a slide receiving portion 308. The transmission belt 303 is wrapped around the first pulley 302 and the second pulley 304. The second pulley 304 and the rotary gear 305 are integrally carried on a rotating shaft 311. The swing gear 306 is carried on a rotating shaft 312. The slide shaft 307 projects at an upper end of the swing gear 306. The slide receiving portion 308 is integrally formed perpendicular to the folding plate 32. The slide receiving portion 308 has a slide groove 3081 receiving the slide shaft 307. The slide shaft 307 is freely movably engaged with the slide groove 3081 via a spacer 309.

The turning mechanism 300 operates as follows. That is, when the motor 301 works, the rotary gear 305 rotates by way of the first pulley 302, the transmission belt 303, and the second pulley 304. When the rotary gear 305 rotates, the swing gear 306 swings, with the result that the folding plate 32 turns on the rotating shaft 31.

That is, when the rotary gear 305 rotates in direction R1, the swing gear 306 swings in direction R3 so that the slide shaft 307 moves in the slide groove 3081 of the slide receiving portion 308, with the result that the folding plate 32 turns in direction R3. Reversely, when the rotary gear 305 rotates in direction R2, the swing gear 306 swings in direction R4 so that the slide shaft 307 moves in the slide receiving portion 308, with the result that the folding plate 32 turns in direction R4. Therefore, according to the turning mechanism 300, the folding plate 32 can be turned 180 degrees on a horizontal plane as shown in FIGS. 10A to 10C. Thus, according to the first folding device 3*a*, the protrusion 103 of the paper sheet 100 placed on the folding plate 32 positioned outside in the width direction as shown in FIG. 10A can be folded back inside such that the protrusion 103 is overlaid via the upper guide plate 36 on the surface of the back surface part 102, by turning the folding plate 32 in direction R5.

The position (tilt angle) of the folding plate 32 in FIG. 8 corresponds to the placement position shown in FIG. 10A, and the position (tilt angle) of the folding plate 32 in FIG. 9 corresponds to FIG. 10B indicating the way to move to the overlaid position from the placement position shown in FIG. 10A.

Figure 12:
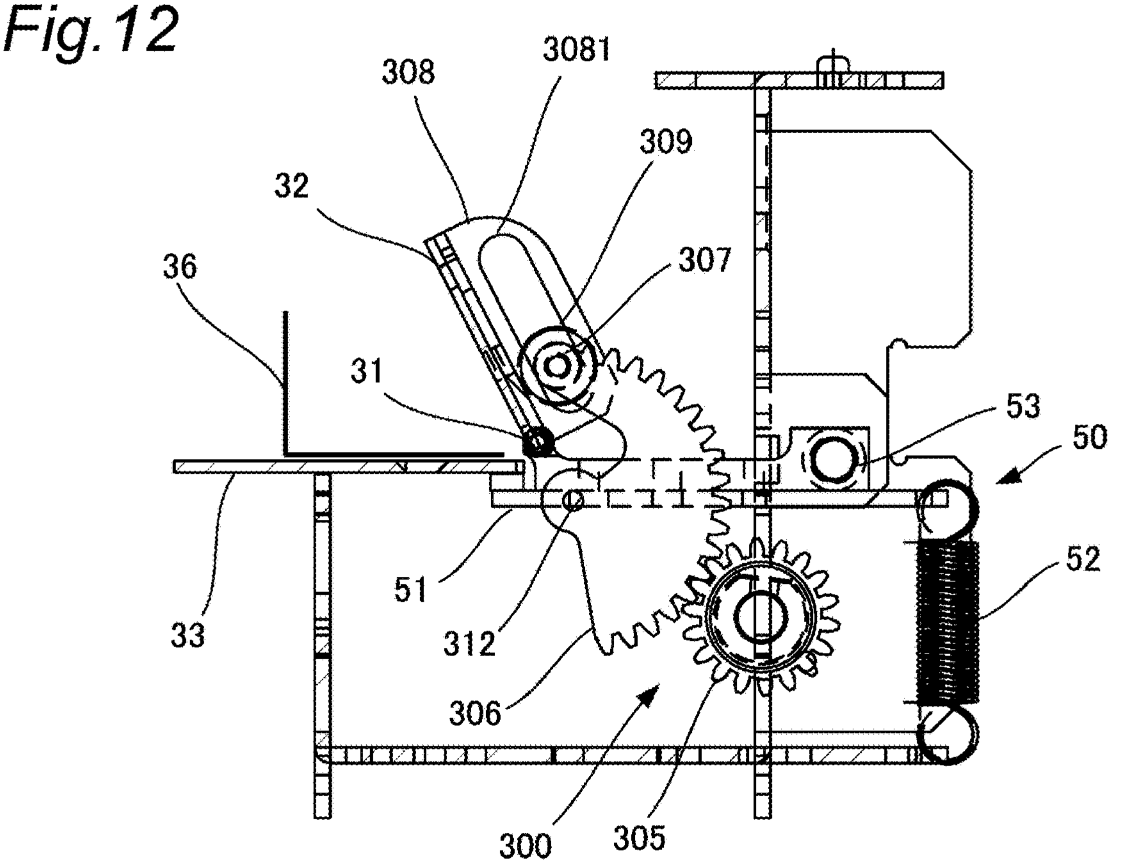
FIG. 12 is a view showing how a rotating shaft moving mechanism works.
Figure 13:
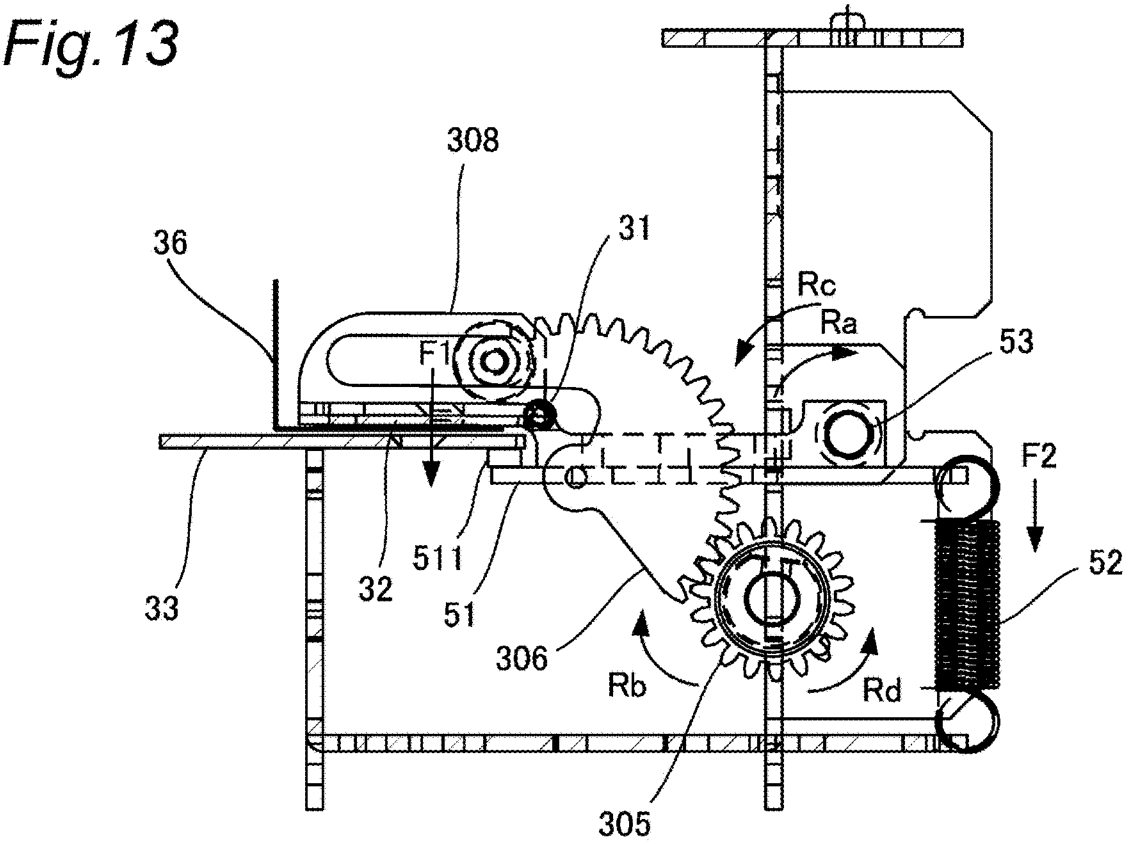
FIG. 13 is a view showing how the rotating shaft moving mechanism works.
Figure 14:
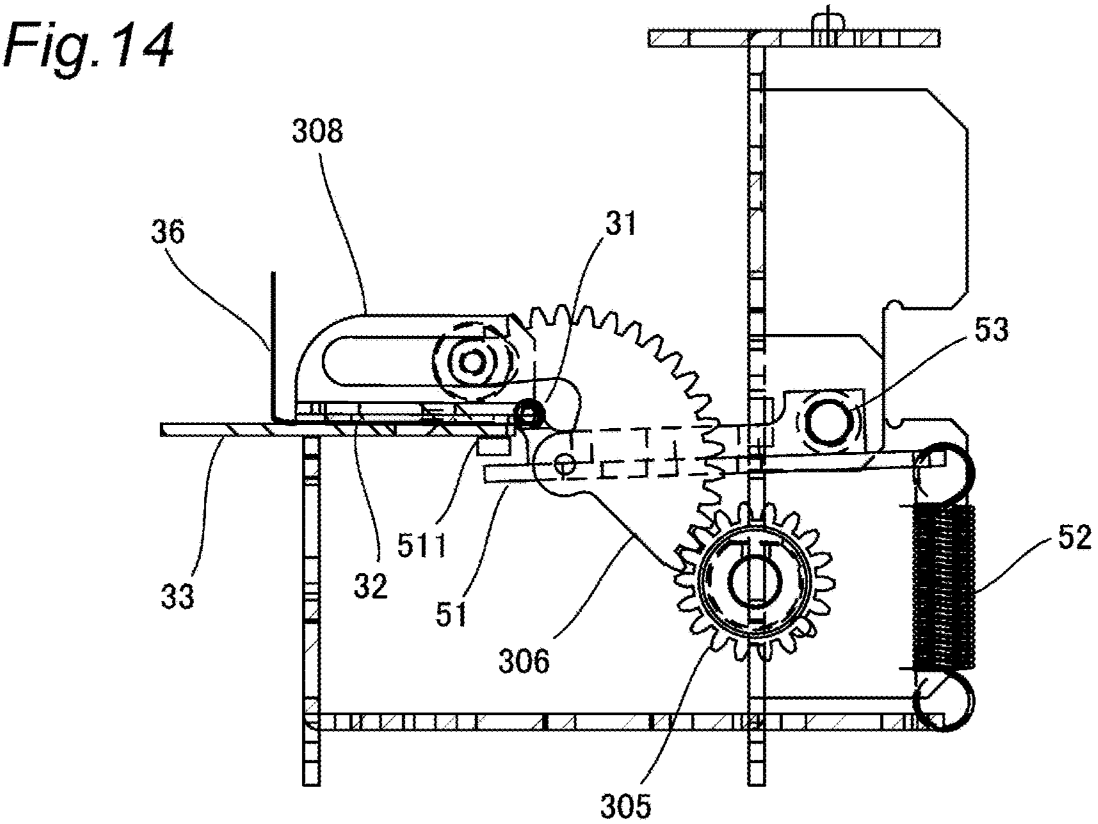
FIG. 14 is a view showing how the rotating shaft moving mechanism works.

The rotating shaft moving mechanism 50 vertically moving the rotating shaft 31 of the folding plate 32 will then be described with reference to FIGS. 12 to 14. In FIGS. 12 to 14, the conveyance roller pair (the driving roller 38 and the driven roller 35) are not shown.

The rotating shaft moving mechanism 50 is a mechanism that vertically moves the rotating shaft 31 of the folding plate 32 while carrying it freely turnably, and includes a support member 51, a spring 52, and a rotating shaft 53.

The support member 51 is integrally carried on the rotating shaft 53, with its one end being urged downward by the sprig 52 and the other end providing support to the rotating shaft 31 of the folding plate 32.

The rotating shaft moving mechanism 50 and the above turning mechanism 300 are coupled to each other by sharing the rotating shaft 31 of the folding plate 32, so that the support member 51 of the rotating shaft moving mechanism 50 turns in liaison with the angle of the folding plate 32 in the turning mechanism 300 to thereby allow the rotating shaft 31 of the folding plate 32 to move vertically.

In detail, when the rotary gear 305 rotates in the above turning mechanism 300, the swing gear 306 swings and the folding plate 32 turns. As a result, the vertical position of the rotating shaft 31 is determined depending on the angle of the folding plate 32. That is, actions are performed as described in (1) to (5) below.

(1) Since, in the basis configuration, one end of the support member 51 is biased downward (in direction F2) by the spring 52, the support member 51 rotates in direction Ra on the rotating shaft 53 until it hits against a stopper 511.

(2) When the rotary gear 305 is rotated in direction Rb from that state, a force is generated in direction F1.

(3) F1 acts as a moment that allows the support member 51 to rotate on the rotating shaft 53 in direction Rc.

(4) At this time, the force relationship between the rotational moments is expressed as Ra<Rc, whereupon the other end of the support member 51 and the rotating shaft 31 of the folding plate 32 are pushed down downward so that the folding plate 32 can press the fold of the paper sheet.

(5) Reversely, when the rotary gear 305 is rotated in direction Rd, the force in direction F1 is released and the support member 51 rotates on the rotating shaft 53 in direction Ra again by the downward biasing force (in direction F2) of the spring 52, whereupon the other end of the support member 51 and the rotating shaft 31 of the folding plate 32 are pushed up upward so that the folding plate 32 can release the pressing against the fold of the paper sheet.

The position (tilt angle) of the folding plate 32 in FIG. 12 corresponds to FIG. 10B indicating the way to move to the folding position from the placement position shown in FIG. 10A. The vertical position of the rotating shaft 31 of the folding plate 32 corresponds to a second position where a predetermined gap is formed between the paper sheet and the folding plate.

Figure 11D:
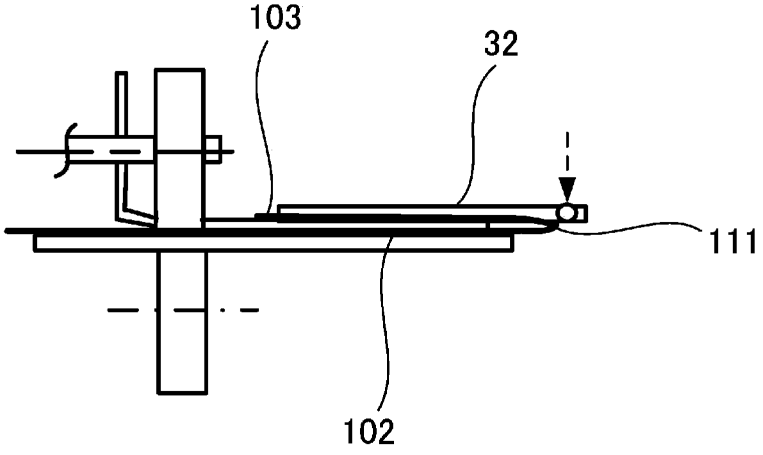
FIGS. 11D and 11E are views showing the states before and after folding back the folding plate in the first folding section.
Figure 11E:
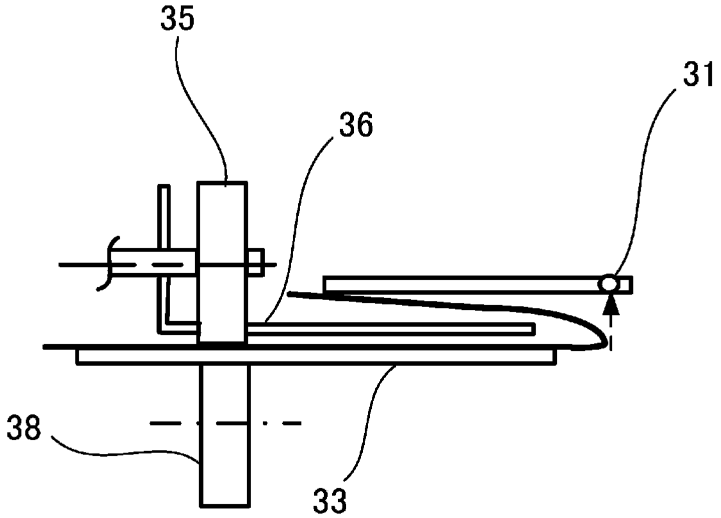

The position (tilt angle) of the folding plate 32 in FIG. 13 corresponds to a position before pressing shown in FIG. 10C or a retracted position during the conveyance shown in FIG. 11E. The vertical positions of the rotating shaft 31 of the folding plate 32 both correspond to the second position where a predetermined gap is formed between the paper sheet and the folding plate.

The position (tilt angle) of the folding plate 32 in FIG. 14 corresponds to a pressing position shown in FIG. 11D. The vertical position of the rotating shaft 31 of the folding plate 32 corresponds to a first position where the protrusion 103 of the paper sheet is pressed after being folded.

Since, according to the above, the paper folding unit is configured to allow the arrangement position of the turning shaft 31 of the folding plate 32 to move in liaison with the angle through which the folding plate 32 turns, rigid creases are formed at the paper folded parts upon folding processing and the folding-processed paper sheet can be smoothly conveyed downstream of the folding position in the paper conveyance direction.

[Glue Application Section 5]

The glue application section 5 includes a pair of applicators 5*a* and 5*b* arranged facing each other on both sides in the width direction. The applicators 5*a* and 5*b* have a transversely symmetric configuration.

The applicators 5*a* and 5*b* have a nozzle portion, a position setting mechanism, and a vertical driving mechanism (not shown). The nozzle portion can apply glue to a paper sheet in conveyance at predetermined timing.

[Second Folding Section 6]

The second folding section 6 is a paper folding device that folds the planar paper sheet 100 while conveying it along the conveyance plane 200, and includes a first conveyance roller pair 86 arranged on the upstream side in the paper conveyance direction, a second conveyance roller pair 87 arranged on the downstream side in the paper conveyance direction, a switching gate plate 63 disposed between both the roller pairs, and a folding plate 62 arranged above the switching gate plate 63.

The switching gate plate 63 is turnable on a support shaft 631 and interferes with a paper sheet 100 in conveyance to allow switching between a first guide position where the leading edge of the paper sheet 100 is guided upward so as to pass through a top surface of an upper roller 871 of the second conveyance roller pair 87 and a second guide position where the leading edge of the paper sheet 100 is guided in substantially horizontal direction toward a nip portion 873 of the second conveyance roller pair 87. The folding plate 62 is configured to be vertically movable while keeping its substantially horizontal posture, to allow switching between a flat-folding position close to the switching gate plate 63 arranged at the second guide position and a retracted position where it retracts apart a predetermined distance from the switching gate plate 63.

[Pressurization Section 8]

A pressurization section 8 includes a vertically movable upper die 8*a* and an immovable lower die 8*b* to clamp therebetween a crease of the paper sheet 100 folded by the second folding section 6, thereby applying further pressure to the crease to make it more rigid.

[Paper Discharge Section 7]

The paper discharge section 7 includes the conveyance roller pair 88 and a paper discharge tray 71. The conveyance roller pair 88 are disposed to act as discharge rollers. Specifically, as shown in FIG. 1, the conveyance roller pair 88 are arranged in the vicinity of and downstream in the conveyance direction of the second conveyance roller pair 87 of the second folding section 6. The paper discharge tray 71 tilts diagonally upward from a position below the conveyance plane 200 and downstream in the conveyance direction.

The operations of the paper bag making machine 10 with the above configuration will then be described.

First, a paper sheet 100 shown in FIG. 2A is placed on the paper feed tray 11. At this time, the front surface part 101 lies on the downstream side in the conveyance direction. A switch (not shown) is then turned on to start the operations.

(1) A topmost paper sheet 100 on the paper feed tray 11 is sent out toward the conveyance roller pair 81 while being sucked by the air suction belt in the air paper feed unit 12, and after delivery to the conveyance roller pair 81, the paper sheet 100 is further conveyed downstream in the conveyance direction by the conveyance roller pair 81. Afterward, the paper sheet 100 passes through the first crease processing section 2. At that time, the first crease processing section 2 operates to form creases at the second and third folds 112 and 113. As a result, the front surface part 101 is easily folded back toward the back surface part 102. The backmost surface part 104 is easily folded back toward the folded-back front surface part 101.

(2) The paper sheet 100 conveyed from the first crease processing section 2 moves through the second crease processing section 4. At this time, the first folds 111 (at left and right two places in the width direction) of the paper sheet 100 each lie immediately below the crease blades (circular blades) of the second crease processing section 4 disposed at two places in the width direction perpendicular to the conveyance direction. The second crease processing section 4 operates to form creases at the first folds 111. This allows the protrusions 103 (at left and right two places in the width direction) to be easily folded back inward.

(3) The paper sheet 100 creased by the second crease processing section 4 comes to a stop at the first folding section 3. By previously forming creases at the folds 111 used when folding the protrusions 103 of the paper sheet, the accuracy of the fold processing positions can be ensured when folding the protrusions 103.

As shown in FIGS. 10A to 10C and FIGS. 11D and 11E, the first folding section 3 includes, in addition to the basic configuration for folding back the protrusion 103 by the folding plate 32, the upper guide plate 36 spaced a predetermined gap (of the order of 0.5 mm) above the lower guide plate 33, and the conveyance roller pair (the driving roller 38 and the driven roller 35) that further convey downstream the paper sheet 100 conveyed on the lower guide plate 33. The upper and lower guide plates 36 and 33 are notched at the nip portion of the conveyance roller pair. The upper guide plate 36 is, for example, in the form of a leaf spring.

As a result of linkage of the rotating shaft moving mechanism 50 and the turning mechanism 300 in the above paper folding unit, the position (tilt angle) of the folding plate 32 and the vertical position of the rotating shaft 31 of the folding plate 32 transition as follows.

In FIG. 10A, the folding plate 32 of the folding device 3*a*(3*b*) of the first folding section 3 lies outside in the width direction, with the protrusion 103 on each side of the paper sheet 100 being placed on the folding plate 32 (placement position). At this time, the vertical position of the rotating shaft 31 of the folding plate 32 lies at the second position where a predetermined gap is formed between the paper sheet and the folding plate.

Next, in FIG. 10B, the folding plate 32 turns in direction R5 toward the inside lower guide plate 33, whereby the protrusion 103 is folded back inside at the creased first fold 111 (folding position). At this time, the vertical position of the rotating shaft 31 of the folding plate 32 lies at the second position where a predetermined gap is formed between the paper sheet and the folding plate.

The folding plate 32 further turns to reach a position (pre-pressing position) immediately before pressing the protrusion 103 of the paper sheet toward the back surface part 102, as shown in FIG. 10C. At this time, the folding plate 32 is in its horizontal posture. The vertical position of the rotating shaft 31 of the folding plate 32 lies at the second position where a predetermined gap is formed between the paper sheet and the folding plate.

Next, in FIG. 11D, the folding plate 32 descends in its horizontal posture toward the upper guide plate 36, to press the protrusion 103 of the paper sheet via the upper guide plate 36 toward the back surface part 102 (pressing position). Subsequent to the descent, the vertical position of the rotating shaft 31 of the folding plate 32 comes to the first position pressing the paper folded part after folding.

Afterward, in FIG. 11E, the folding plate 32 ascends, in its horizontal posture, by a predetermined distance in a direction away from the upper guide plate 36 (retracted position). Subsequent to the ascent, the vertical position of the rotating shaft 31 of the folding plate 32 again comes to the second position where a predetermined gap is formed between the paper sheet and the folding plate.

The paper sheet 100 with the protrusions 103 folded back are conveyed downstream in the conveyance direction by the conveyance roller pair (the driving roller 38 and the driven roller 35). By allowing the folding plate 32 to ascend by a predetermined distance in a direction away from the upper guide plate 36 before staring the conveyance of the paper sheet 100, the folding-processed paper sheet can be smoothly conveyed downward of the folding position in the paper conveyance without being interfered with by the folding plate 32 and the upper and lower guide plates in pair. Since, when moving to the retracted position, the folding plate 32 ascends by a predetermined distance while keeping its horizontal posture, it can stably convey, as the conveyance guide, the folding-processed paper sheet up to the next pressure rollers.

The first position refers to a position of the rotating shaft 31 where the undersurface of the folding plate 32 can be fully overlaid on the top surface of the upper guide plate 36 due to the rigid formation of the folds 111 of the paper sheet 100. In detail, the first position refers to a position of the rotating shaft 31 where the folding plate 32 descends in its horizontal undersurface to overlie on the top surface of the upper guide plate 36 in the form of a leaf spring spaced a predetermined gap (of the order of 0.5 mm) above the lower guide plate 33, with further descent of the folding plate 32 deforming the upper guide plate 36 so as to allow intimate contact with the lower guide plate 33.

The second position refers to a position of the rotating shaft 31 where, when conveying the folding-processed paper sheet downstream of the folding position in the paper conveyance direction, the folding plate 32 in its horizontal posture can be arranged spaced a predetermined gap (of the order of 1.5 mm to 2 mm) vertically “above” the lower guide plate.

It is therefore preferable that the rotating shaft 31 of the folding plate 32 be vertically movable depending on the situation.

Although the transitions of the position (tilt angle) of the folding plate 32 and the vertical position of the rotating shaft 31 of the folding plate 32 described above (shown in FIGS. 10A to 10C and FIGS. 11D and 11E) are configured such that the positions lie at the first position only during the pressing (after descent) of FIG. 11D and such that in the other situations they lie at the second position, the present invention is not limited thereto. The transitions may be configured such that the positions lie at the second position only during the retraction (after ascent) of FIG. 11E and such that in the other situations they lie at the first position.

Since the arrangement position of the turning shaft 31 of the folding plate 32 includes at least the first position and the second position, rigid creases are formed at the paper folded parts upon folding processing and the folding-processed paper sheet can be smoothly conveyed downstream of the folding position in the paper conveyance direction.

Since the folding plate 32 is configured to reciprocatively turn on the turning shaft 31 substantially parallel to the paper conveyance path, through the folding position where the protrusion 103 of the paper sheet 100 is folded, between the placement position where the protrusion 103 of the paper sheet 100 is placed and the pressing position where the protrusion 103 of the paper sheet 100 is pressed toward the back surface part 102, rigid creases are formed with high accuracy at the paper folded parts of the paper sheet upon folding processing.

In FIGS. 10A to 10C and FIGS. 11D and 11E described above, there are disposed the upper guide plate 36 and the driven roller 35 as a pressing roller that retains the paper sheet 100 on the upper guide plate 36, and when the folding unit performs folding processing of the protrusion 103 of the paper sheet, a control unit provides control to bring the drive of the pair of conveyance rollers (the driving roller 38 and the driven roller 35) to a halt to stop the conveyance of the paper sheet 100 at the folding position so that the folded part of the paper sheet 100 is folded with the back surface part 102 of the paper sheet 100 retained between the pair of conveyance rollers 38 and 35.

According to the above, the folded parts (protrusions 103) of the paper sheet 100 are folded back on the top surface of the upper guide plate 36 with the back surface part 102 of the paper sheet 100 retained between the pair of upper and lower guide plates 36 and 33, while at the same time the folded parts of the paper sheet are folded with the paper body part retained between the pair of conveyance rollers 38 and 35. Accordingly, the accuracy of the fold positions can be ensured when further folding the folded parts.

Although in the above paper folding device the case has been described as the embodiment where the pair of upper and lower guide plates 36 and 33 are disposed, the present invention is not limited thereto. At the folding position, there may be disposed the lower guide plate 33 positioned facing the folding plate 32, and the arrangement position of the turning shaft 31 of the folding plate 32 may be vertically movable with respect to the lower guide plate 33. According to this, by moving the arrangement position of the turning shaft 31 of the folding plate 32 to the optimum position, it is possible to rigidly form the folds 111 of the protrusions 103 of the paper sheet 100 upon folding processing and to smoothly convey the folding-processed paper sheet 100 downstream of the folding position in the paper conveyance direction.

(4) The paper sheet 100 with the protrusions 103 folded back is conveyed downstream in the conveyance direction by the conveyance roller pair 85, to pass through the glue application section 5. In the glue application section 5, upon start of the passage of the folded-back protrusions 103 on both sides of the paper sheet 100, the nozzle portions 5*a* and 5*b* disposed at two places in the width direction perpendicular to the conveyance direction move downward to come into abutment against the surfaces of the protrusions 103, and upon end of the passage of the protrusions 103, the nozzle portions 5*a* and 5*b* move upward to separate the nozzle portions 5*a* and 5*b* from the surfaces of the protrusions 103. Glue is thereby applied to the surfaces of the protrusions 103 folded back. The folded-back protrusions 103 pass through the nozzle portions 5*a* and 5*b* while or after being pressed by the conveyance roller pair 85 positioned upstream of the nozzle portions 5*a* and 5*b* in the conveyance direction. This enables the nozzle portions 5*a* and 5*b* to stably perform the glue application work.

(5) The second folding section 6 is a paper folding device that folds the planar paper sheet 100 while conveying it along the conveyance plane 200, and includes the first conveyance roller pair 86 arranged on the upstream side in the paper conveyance direction, the second conveyance roller pair 87 arranged on the downstream side in the paper conveyance direction, the switching gate plate 63 disposed between both the roller pairs, the folding plate 62 arranged facing the switching gate plate 63, and a control unit (not shown) controlling the operations of the entire device.

The switching gate plate 63 interferes with the paper sheet 100 in conveyance to bend the paper conveyance direction outside of the paper conveyance plane 200, and allows switching between a first guide position where the leading edge of the paper sheet 100 is guided toward the surface of one roller of the second conveyance roller pair 87 and a second guide position where the leading edge of the paper sheet 100 is guided along the paper conveyance plane 200 toward the nip portion 873 of the second conveyance roller pair 87.

The folding plate 62 is configured to be vertically movable toward the switching gate plate 63 while keeping the substantially horizontal posture, to allow switching between the flat-folding position close to the switching gate plate 63 arranged at the second guide position and the retracted position where it retracts apart a predetermined distance from the switching gate plate 63.

The control unit provides control to: allow the switching gate plate 63 arranged at the first guide position to guide the leading edge of the paper sheet 100 in conveyance so as to pass through by a predetermined amount toward the surface of one roller of the second conveyance roller pair 87; thereafter switch the position of the switching gate plate 63 to the second guide position; and then allow the folding plate 62 arranged at the retracted position to descend to the flat-folding position in the substantially horizontal posture so as to clamp the paper sheet 100 on the switching gate plate 63, to thereby fold back the leading edge of the paper sheet 100 along the surface of one roller of the second conveyance roller pair 87.

Specifically, the following processes are performed in sequence as one embodiment.

Figure 15:
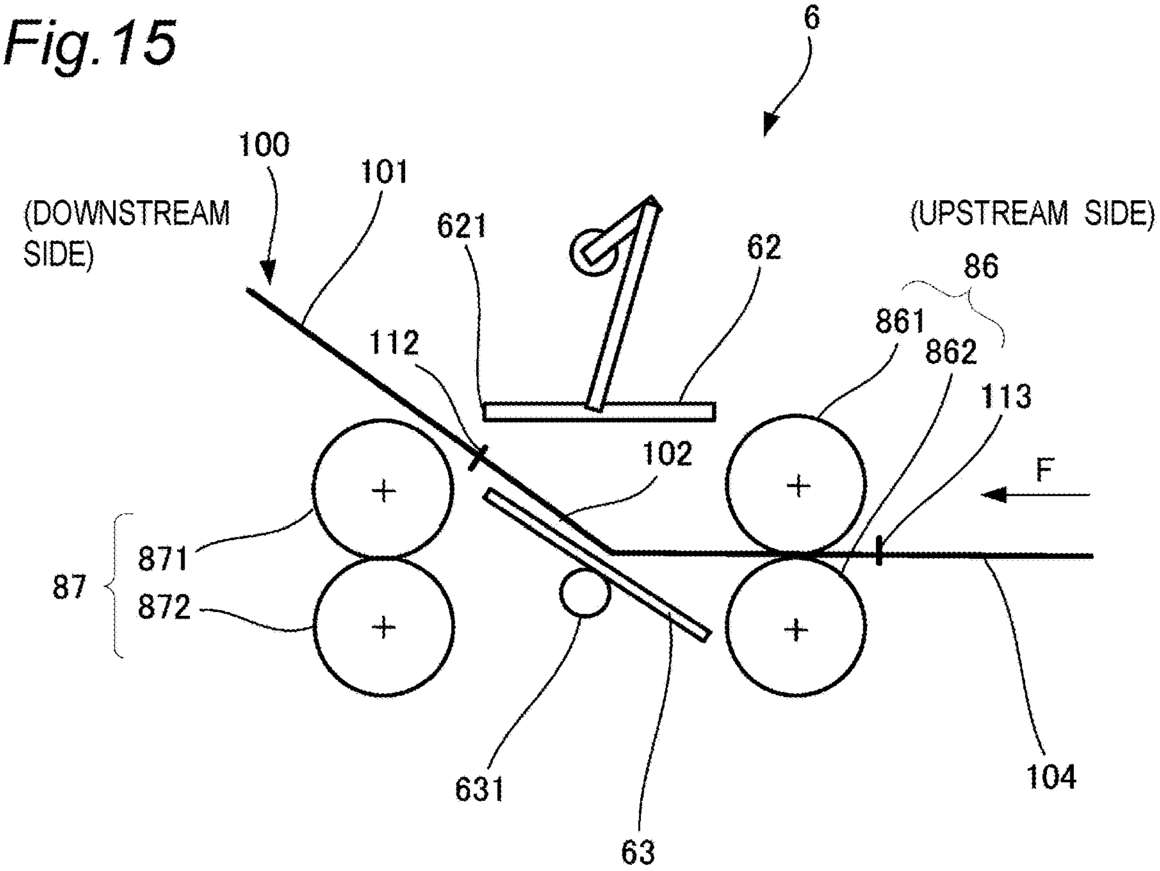
FIG. 15 is a view showing how the paper sheet is processed in a second folding section.

A paper sheet 100 with the protrusions 103 applied with glue is conveyed to the second folding section 6 (in direction F) by the conveyance roller pair 85. At this time, the switching gate plate 63 is set, as the first guide position, upward toward the second conveyance roller pair 87. Hence, as shown in FIG. 15, the paper sheet 100 is guided upward by the switching gate plate 63 so that the leading edge of the paper sheet 100 passes through the top surface of the upper roller 871 of the second conveyance roller pair 87, and the conveyance comes to a temporary stop when the position of the second fold 112 of the paper sheet 100 arrives at the folding position (position directly below an end 621 of the folding plate 62). During the time, the folding plate 62 remains at the retracted position.

Since the upper roller 861 of the first conveyance roller pair 86 is set to a width dimension that does not come into contact with the surfaces of the protrusions 103, glue applied to the protrusions 103 of the paper sheet 100 cannot adhere to the first conveyance roller pair 86.

Figure 16:
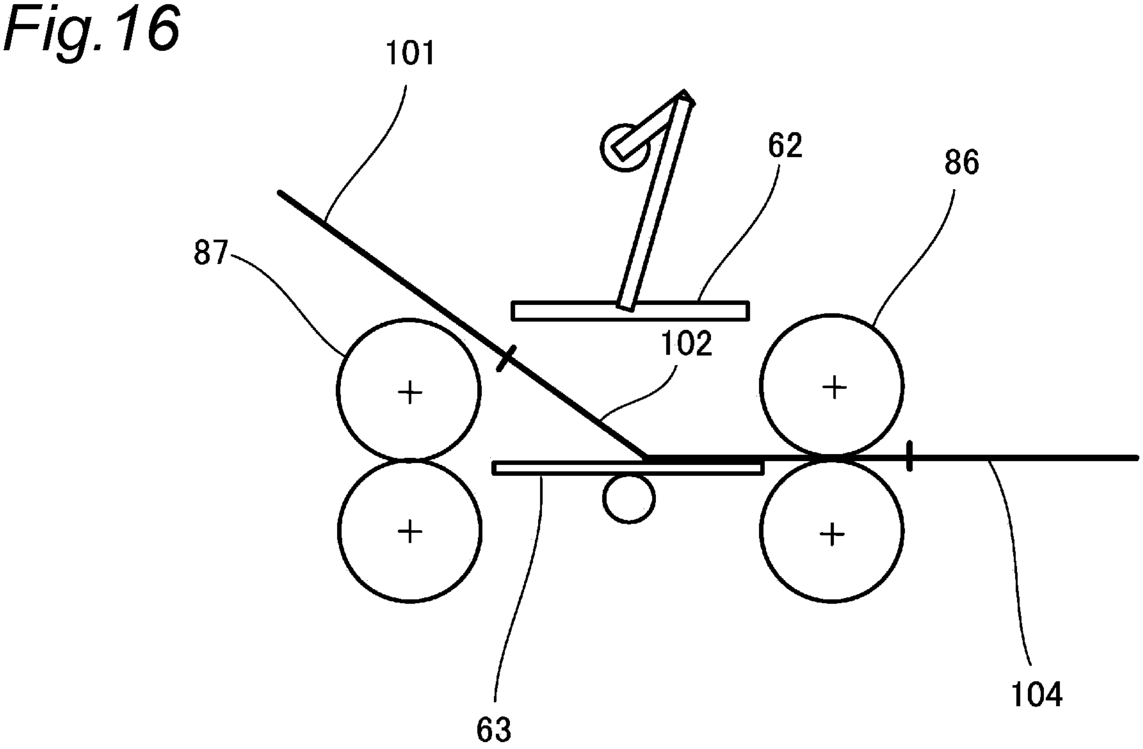
FIG. 16 is a view continued from FIG. 15, showing how the paper sheet is processed.

Next, as shown in FIG. 16, the switching gate plate 63 is moved to the second guide position (substantially horizontal position) with the folding plate 32 remaining at the retracted position.

Figure 17:
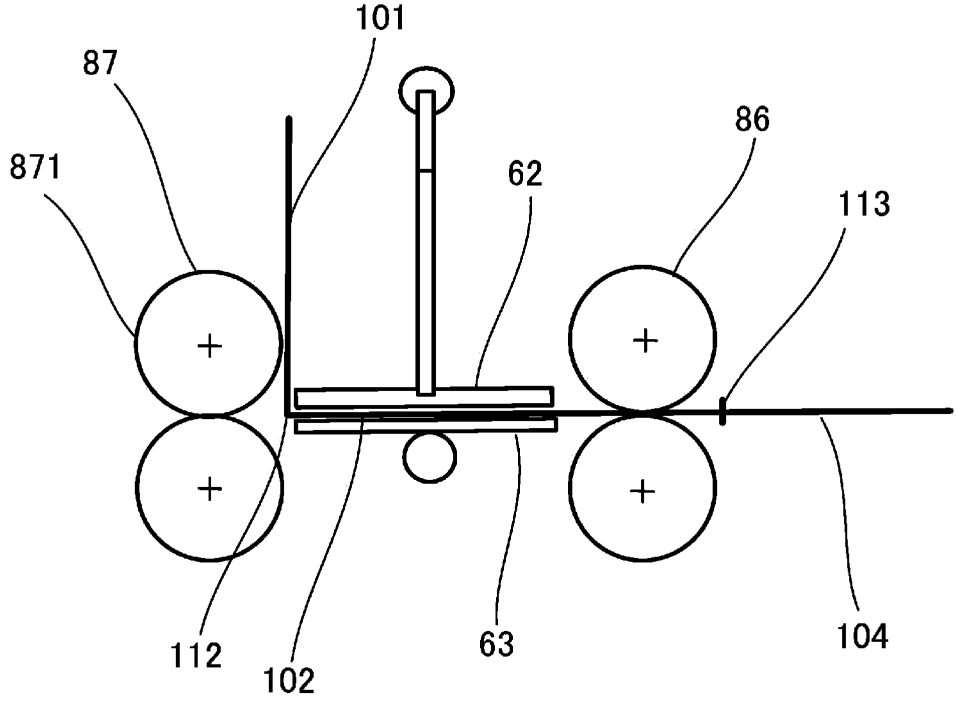
FIG. 17 is a view continued from FIG. 16, showing how the paper sheet is processed.

Next, as shown in FIG. 17, the folding plate 62 arranged at the retracted position is caused to descend in the substantially horizontal posture to the flat-folding position so as to clamp the paper sheet 100 on the switching gate plate 63, to thereby fold back the front surface part 101 of the paper sheet 100 from the second fold 112 along the surface of the upper roller 871 of the second conveyance roller pair 87. At this time, the proximity distance between the switching gate plate 63 and the folding plate 62 after descent is configured to secure a gap at least enough to allow the conveyance of the paper sheet through between the folding plate 62 and the switching gate plate 6. For example, a gap of approx. 1 mm is secured.

According to the above, due to no need to form the paper insertion space (branch path) and the stopper, the paper folding mechanism can be configured simply and at low cost without complicating the structure. Since the control unit automatically adjusts the folding positions in conformity with the various folding specifications, the paper folding device with high operability can be provided. Furthermore, wrinkles are prevented from forming on the protrusions folded back, and also in the case of performing folding processing, glue cannot adhere to the folding mechanism interiors such as the stopper to adversely affect the deliverable quality.

Figure 18:
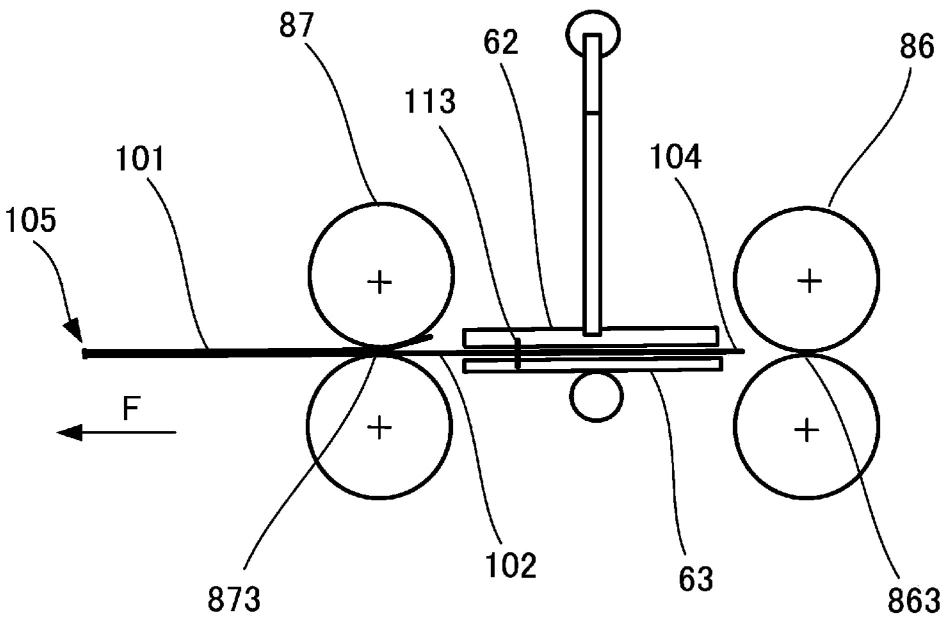
FIG. 18 is a view continued from FIG. 17, showing how the paper sheet is processed.

Next, as shown in FIG. 18, posterior to folding back the front surface part 101 of the paper sheet 100 by the descent of the folding plate 62, the paper leading edge folded part 105 after folding back the leading edge of the paper sheet is further conveyed toward the nip portion 873 of the second conveyance roller pair 87 by the first conveyance roller pair 86 so that the leading edge folded part 105 of the paper sheet is clamped by the nip portion 873 of the second conveyance roller pair 87 to be conveyed in direction F, to thereby press and fold down the paper leading edge folded part 105. The entire front surface part 101 is folded back to be superimposed on the surface of the front surface part 101 and, at that time, the both edges of the front surface part 101 are joined to the protrusions 103. As a result, the Western-style envelope 90 is obtained. The conveyance in direction F continues until the backmost surface part 104 of the paper sheet 100 leaves the nip portion 863 of the first conveyance roller pair 86 by a predetermined amount. At this time, the paper sheet 100 is conveyed through the gap between the folding plate 62 and the switching gate plate 63 (while being guided by both the plates). This enables the paper sheet to be delivered, securely without occurrence of wrinkles, etc., to a subsequent pressing processing section implemented by the nip portion 873 of the second conveyance roller pair 87.

According to the above, control is provided such that, posterior to folding back the front surface part 101 of the paper sheet by the descent of the folding plate 62, the paper leading edge folded part 105 after being folded back is folded down while being pressed by the nip portion 873 of the second conveyance roller pair 87, whereby creases can be securely applied to the paper sheet.

Although the case has been described as one embodiment where the paper folding device (first folding section 3) of the present invention is employed as the paper folding mechanism in the paper bag making machine 10 making the Western-style envelope, it may be implemented as a paper folding machine (paper folding device) that merely folds the paper sheet flat. The present invention is not limited to the above embodiment, and can be carried out with various modifications.

EXPLANATIONS OF LETTERS OR NUMERALS

F conveyance direction
F' conveyance direction
R rotational direction
3 first folding section
6 second folding section
10 paper bag making machine
10A device body
31 rotating shaft
32 folding plate

33 lower guide plate
35 driven roller
36 upper guide plate
38 driving roller
50 rotating shaft moving mechanism
51 support member
52 spring
53 rotating shaft
100 paper sheet
101 front surface part
102 back surface part
103 protrusion
104 backmost surface part
105 folded part
111 first fold
112 second fold
113 third fold
300 turning mechanism

The invention claimed is:

1. A paper folding device for folding a planar paper sheet having a body part and a folded part projecting from the body part while conveying the paper sheet along a paper conveyance path, the paper folding device comprising:

a folding unit disposed at a folding position where the paper sheet is folded on the paper conveyance path, the folding unit including a folding plate reciprocatively turning on a turning shaft parallel to the paper conveyance path, to thereby fold the folded part toward the body part, and a lower guide plate arranged at a position facing the folding plate at the folding position, wherein the folding plate is reciprocatively turnable at least between a pre-pressing position and a placement position with the turning shaft at a first height position, the folding plate being placed above the lower guide plate and facing the lower guide plate at the pre-pressing position, and the folding plate being retracted from above the lower guide plate and the folded part of the paper sheet is placed on the folding plate at the placement position, wherein the turning shaft is configured to be movable from the first height position to a second height position lower than the first height position thereby moving the folding plate from the pre-pressing position to a pressing position where the folding plate is closer to the lower guide plate than the pre-pressing position to press the folded part toward the body part by the folding plate.

2. The paper folding device according to claim 1, wherein the folding plate is configured to reciprocatively turn on the turning shaft between the placement position and the pressing position.

3. The paper folding device according claim 2, comprising:

a paper folding-back mechanism that reciprocatively turns the folding plate on the turning shaft of the folding plate, the paper folding-back mechanism being configured to move the arrangement position of the turning shaft of the folding plate in liaison with an angle through which the folding plate is turned.

4. The paper folding device according to claim 1, wherein the turning shaft is configured to be movable from the second height position to the first height position thereby releasing the pressing during paper conveyance after the pressing to form a predetermined gap between the paper sheet and the folding plate.

5. The paper folding device according to claim 1, comprising:

a crease processing unit disposed upstream of the folding position in a paper conveyance direction, the crease processing unit being configured to form a crease in advance at a fold when performing folding processing of the folded part of the paper sheet.

6. A paper folding device for folding a planar paper sheet having a body part and a folded part projecting from the body part while conveying the paper sheet along a paper conveyance path, the paper folding device comprising:

a folding unit disposed at a folding position where the paper sheet is folded on the paper conveyance path, the folding unit including a folding plate reciprocatively turning on a turning shaft parallel to the paper conveyance path, to thereby fold the folded part toward the body part and a lower guide plate arranged at a position facing the folding plate at the folding position, wherein the turning shaft is vertically movable with respect to the lower guide plate; and wherein the folding unit includes an upper guide plate arranged spaced a predetermined gap above the lower guide plate at the folding position, the upper guide plate together with the lower guide plate making up a part of the paper conveyance path, and the folding plate is configured such that, when performing folding processing of the folded part of the paper sheet, an undersurface of the folding plate is superimposed on a top surface of the upper guide plate with the folded part of the paper sheet clamped therebetween.

7. A paper folding device for folding a planar paper sheet having a body part and a folded part projecting from the body part while conveying the paper sheet along a paper conveyance path, the paper folding device comprising:

a folding unit disposed at a folding position where the paper sheet is folded on the paper conveyance path, the folding unit including a folding plate reciprocatively turning on a turning shaft parallel to the paper conveyance path, to thereby fold the folded part toward the body part, and a lower guide plate arranged at a position facing the folding plate at the folding position, wherein the turning shaft is vertically movable with respect to the lower guide plate; and wherein the folding unit includes a pair of conveyance rollers for guiding the body part of the paper sheet so as to pass through between the upper guide plate and the lower guide plate at the folding position on the paper conveyance path, and control unit that controls drive of the pair of conveyance rollers, and when the folding unit performs folding processing of the folded part of the paper sheet, the control unit provides control to bring drive of the pair of conveyance rollers to a halt to stop conveyance of the paper sheet at the folding position so that the folded part of the paper sheet is folding-processed with the body part of the paper sheet retained between the pair of conveyance rollers.

* * * * *